(12) United States Patent
Yamamoto et al.

(10) Patent No.: US 9,239,683 B2
(45) Date of Patent: Jan. 19, 2016

(54) MAGNETIC DISK DEVICE

(71) Applicant: KABUSHIKI KAISHA TOSHIBA, Tokyo (JP)

(72) Inventors: Michio Yamamoto, Inagi (JP); Tetsuo Kuribayashi, Yokohama (JP); Masami Tashiro, Komae (JP); Kenji Inoue, Kamakura (JP); Takumi Kakuya, Ebina (JP); Hironori Kanno, Fussa (JP); Keiichi Yorimitsu, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1 day.

(21) Appl. No.: 14/207,022

(22) Filed: Mar. 12, 2014

(65) Prior Publication Data
US 2015/0138667 A1    May 21, 2015

Related U.S. Application Data

(60) Provisional application No. 61/906,232, filed on Nov. 19, 2013.

(51) Int. Cl.
*G06F 3/06* (2006.01)
*G11B 27/36* (2006.01)

(52) U.S. Cl.
CPC .............. *G06F 3/0611* (2013.01); *G06F 3/064* (2013.01); *G06F 3/0653* (2013.01); *G06F 3/0676* (2013.01); *G11B 27/36* (2013.01)

(58) Field of Classification Search
None
See application file for complete search history.

(56) References Cited

U.S. PATENT DOCUMENTS

| | | | |
|---|---|---|---|
| 5,812,335 A * | 9/1998 | Kool | G11B 5/012 360/51 |
| 6,000,021 A * | 12/1999 | Saito | B82Y 10/00 365/185.09 |
| 6,058,047 A * | 5/2000 | Kikuchi | G06F 11/1068 365/185.33 |
| 6,317,875 B1 | 11/2001 | Grimsrud et al. | |
| 6,948,042 B2 * | 9/2005 | Nagase | G06F 3/061 711/117 |
| 7,345,837 B1 * | 3/2008 | Schreck | G11B 5/09 360/31 |
| 7,477,465 B2 * | 1/2009 | Yu | G11B 20/22 360/31 |
| 7,568,068 B2 * | 7/2009 | Kulkarni | G06F 12/0866 711/103 |
| 7,607,000 B1 | 10/2009 | Smith et al. | |
| 8,291,185 B2 * | 10/2012 | Na | G06F 3/0613 711/156 |
| 2006/0265545 A1 * | 11/2006 | Entani | G06F 12/0246 711/103 |
| 2007/0211363 A1 * | 9/2007 | Nagashima | G11B 19/041 360/55 |
| 2011/0238890 A1 * | 9/2011 | Sukegawa | G06F 12/0246 711/103 |
| 2012/0137086 A1 * | 5/2012 | Oe | G06F 3/061 711/154 |
| 2013/0103978 A1 * | 4/2013 | Akutsu | G06F 11/1076 714/6.23 |

* cited by examiner

*Primary Examiner* — Dismery Mercedes

(74) *Attorney, Agent, or Firm* — Knobbe, Martens, Olson & Bear LLP

(57) ABSTRACT

According to one embodiment, there is provided a magnetic disk device including a magnetic disk, a storage unit, and a control unit. The magnetic disk includes a recording region. The storage unit is configured to store a value according to number of accesses to each of a plurality of regions obtained by dividing of the recording region of the magnetic disk in association with each of the plurality of regions. The control unit is configured to count a value according to the number of accesses to each of a plurality of regions in a count step unit that is a value determined according to an elapsed time from occurrence of a specific situation and is a value counted per unit access, and to update the value stored in the storage unit.

10 Claims, 10 Drawing Sheets

FIG.3

ACCESS COUNTER TABLE

| REGION IDENTIFICATION INFORMATION | ACCUMULATION VALUE OF COUNT VALUES |
|---|---|
| IDENTIFICATION INFORMATION OF RG0 | 30 |
| IDENTIFICATION INFORMATION OF RG1 | 19 |
| IDENTIFICATION INFORMATION OF RG2 | 40 |
| IDENTIFICATION INFORMATION OF RG3 | 43 |
| IDENTIFICATION INFORMATION OF RG4 | 48 |
| IDENTIFICATION INFORMATION OF RG5 | 14 |
| IDENTIFICATION INFORMATION OF RG6 | 49 |
| IDENTIFICATION INFORMATION OF RG7 | 49 |
| IDENTIFICATION INFORMATION OF RG8 | 41 |
| IDENTIFICATION INFORMATION OF RG9 | 38 |
| IDENTIFICATION INFORMATION OF RG10 | 42 |
| IDENTIFICATION INFORMATION OF RG11 | 4100 |
| IDENTIFICATION INFORMATION OF RG12 | 2357 |
| IDENTIFICATION INFORMATION OF RG13 | 18 |
| IDENTIFICATION INFORMATION OF RG14 | 23 |
| IDENTIFICATION INFORMATION OF RG15 | 44 |
| IDENTIFICATION INFORMATION OF RG16 | 49 |
| IDENTIFICATION INFORMATION OF RG17 | 19 |

FIG.4

WEIGHT TABLE

| TIME FROM POWER ON [s] | WEIGHT OF COUNTER |
|---|---|
| 0～10 | 100 |
| 10～20 | 10 |
| 20～ | 1 |

FIG.5

COEFFICIENT TABLE

| POWER ON DURATION TIME | ACCESS COUNT WEIGHT CHANGE COEFFICIENT |
|---|---|
| 24 HOURS OR LESS | x1.5 |
| 24 TO 48 HOURS | x1.0 |
| 48 HOURS TO ONE WEEK | x0.5 |
| ONE WEEK OR MORE | x(-1) |

FIG.6

| TRANSLATION TABLE (INITIAL) | |
|---|---|
| LBA | PBA |
| 0 | 0 |
| 1 | 1 |
| 2 | 2 |
| ⋮ | ⋮ |
| 9 | 9 |
| 10 | 10 |
| 11 | 11 |
| ⋮ | ⋮ |
| 19 | 19 |
| 20 | 20 |
| 21 | 21 |
| ⋮ | ⋮ |
| 29 | 29 |
| ⋮ | ⋮ |
| 110 | 110 |
| 111 | 111 |
| ⋮ | ⋮ |
| 119 | 119 |
| 120 | 120 |
| 121 | 121 |
| ⋮ | ⋮ |
| 129 | 129 |
| ⋮ | ⋮ |

RG0: LBA 0–9
RG1: LBA 10–19
RG2: LBA 20–29
RG11: LBA 110–119
RG12: LBA 120–129

| TRANSLATION TABLE (AFTER REALLOCATION) | |
|---|---|
| LBA | PBA |
| 0 | 110 |
| 1 | 111 |
| 2 | 112 |
| ⋮ | ⋮ |
| 9 | 119 |
| 10 | 120 |
| 11 | 121 |
| ⋮ | ⋮ |
| 19 | 129 |
| 20 | 20 |
| 21 | 21 |
| ⋮ | ⋮ |
| 29 | 29 |
| ⋮ | ⋮ |
| 110 | 0 |
| 111 | 1 |
| ⋮ | ⋮ |
| 119 | 9 |
| 120 | 10 |
| 121 | 11 |
| ⋮ | ⋮ |
| 129 | 19 |
| ⋮ | ⋮ |

RG0: LBA 0–9
RG1: LBA 10–19
RG2: LBA 20–29
RG11: LBA 110–119
RG12: LBA 120–129

FIG.7

COPY MANAGEMENT TABLE (INITIAL)

| | LBA | MEMORY ADDRESS |
|---|---|---|
| RG0 { | 0 | |
| | 1 | |
| | 2 | |
| | ⋮ | ⋮ |
| | 9 | |
| RG1 { | 10 | |
| | 11 | |
| | ⋮ | ⋮ |
| | 19 | |
| RG2 { | 20 | |
| | 21 | |
| | ⋮ | ⋮ |
| | 29 | |
| | ⋮ | ⋮ |
| RG11 { | 110 | |
| | 111 | |
| | ⋮ | ⋮ |
| | 119 | |
| RG12 { | 120 | |
| | 121 | |
| | ⋮ | ⋮ |
| | 129 | |
| | ⋮ | ⋮ |

⇒

COPY MANAGEMENT TABLE (AFTER REALLOCATION)

| | LBA | MEMORY ADDRESS |
|---|---|---|
| RG0 { | 0 | |
| | 1 | |
| | 2 | |
| | ⋮ | ⋮ |
| | 9 | |
| RG1 { | 10 | |
| | 11 | |
| | ⋮ | ⋮ |
| | 19 | |
| RG2 { | 20 | |
| | 21 | |
| | ⋮ | ⋮ |
| | 29 | |
| | ⋮ | ⋮ |
| RG11 { | 110 | ADD0 |
| | 111 | ADD1 |
| | ⋮ | ⋮ |
| | 119 | ADD9 |
| RG12 { | 120 | ADD10 |
| | 121 | ADD11 |
| | ⋮ | ⋮ |
| | 129 | ADD19 |
| | ⋮ | ⋮ |

FIG.8

| LAB RANGE | TIME FROM POWER ON | | | THE NUMBER OF ACTUAL ACCESSES | ACCESS COUNTER | | PRIORITY ORDER |
|---|---|---|---|---|---|---|---|
| | 0~10 | 10~20 | 20~ | | | | |
| RG1 | 3 | 1 | 0 | 4 | 465 | 150*3+15*1+1*0 | 2 |
| RG2 | 3 | 2 | 0 | 5 | 480 | 150*3+15*2+1*0 | 1 |
| RG3 | 0 | 3 | 0 | 3 | 45 | 150*0+15*3+1*0 | 7 |
| RG4 | 0 | 1 | 1 | 2 | 16 | 150*0+15*1+1*1 | 8 |
| RG5 | 0 | 2 | 90 | 92 | 120 | 150*0+15*2+1*90 | 5 |
| RG6 | 0 | 2 | 200 | 202 | 275 | 150*0+15*2+1*200 | 4 |
| RG7 | 0 | 2 | 300 | 302 | 330 | 150*0+15*2+1*300 | 3 |
| RG8 | 0 | 1 | 60 | 61 | 75 | 150*0+15*1+1*60 | 6 |
| RG9 | 0 | 0 | 0 | 0 | 0 | 150*0+15*0+1*0 | 9 |
| RG10 | 0 | 0 | 0 | 0 | 0 | 150*0+15*0+1*0 | 9 |

FIG.9

| LAB RANGE | TIME FROM POWER ON | | | THE NUMBER OF ACTUAL ACCESSES | ACCESS COUNTER | | PRIORITY ORDER |
|---|---|---|---|---|---|---|---|
| | 0~10 | 10~20 | 20~ | | | | |
| RG1 | 3 | 1 | 0 | 4 | 155 | 50*3+5*1+1*0 | 4 |
| RG2 | 3 | 2 | 0 | 5 | 160 | 50*3+5*2+1*0 | 3 |
| RG3 | 0 | 3 | 0 | 3 | 15 | 50*0+5*3+1*0 | 7 |
| RG4 | 0 | 1 | 1 | 2 | 6 | 50*0+5*1+1*1 | 8 |
| RG5 | 0 | 2 | 90 | 92 | 100 | 50*0+5*2+1*90 | 5 |
| RG6 | 0 | 2 | 200 | 202 | 210 | 50*0+5*2+1*200 | 2 |
| RG7 | 0 | 2 | 300 | 302 | 310 | 50*0+5*2+1*300 | 1 |
| RG8 | 0 | 1 | 60 | 61 | 65 | 50*0+5*1+1*60 | 6 |
| RG9 | 0 | 0 | 0 | 0 | 0 | 50*0+5*0+1*0 | 9 |
| RG10 | 0 | 0 | 0 | 0 | 0 | 50*0+5*0+1*0 | 9 |

US 9,239,683 B2

MAGNETIC DISK DEVICE

CROSS-REFERENCE TO RELATED APPLICATIONS

This application is based upon and claims the benefit of priority from Provisional Application No. 61/906,232, filed on Nov. 19, 2013; the entire contents of which are incorporated herein by reference.

FIELD

Embodiments described herein relate generally to a magnetic disk device.

BACKGROUND

In a magnetic disk device, in an access time from when an access request to data is generated to when reading/writing of the data is started, mechanical wait times such as a seek time and a rotation wait time exist. The mechanical wait time varies depending on a physical address in the magnetic disk device. Therefore, to improve access performance of the magnetic disk device, it is necessary to appropriately reallocate data in consideration of the access frequency to the magnetic disk.

BRIEF DESCRIPTION OF THE DRAWINGS

FIG. 3 is a diagram illustrating an access counter table in the embodiment;

FIG. 4 is a diagram illustrating a weight table in the embodiment;

FIG. 5 is a diagram illustrating a coefficient table in the embodiment;

FIG. 6 is a diagram illustrating reallocation of data in the embodiment;

FIG. 7 is a diagram illustrating reallocation of data in the embodiment;

FIG. 8 is a diagram illustrating an accumulation value of counting of the access counter when a coefficient=1.5 in the embodiment;

FIG. 9 is a diagram illustrating an accumulation value of counting of the access counter when a coefficient=0.5 in the embodiment;

DETAILED DESCRIPTION

In general, according to one embodiment, there is provided a magnetic disk device including a magnetic disk, a storage unit, and a control unit. The magnetic disk includes a recording region. The storage unit is configured to store a value according to number of accesses to each of a plurality of regions obtained by dividing of the recording region of the magnetic disk in association with each of the plurality of regions. The control unit is configured to count a value according to the number of accesses to each of a plurality of regions in a count step unit that is a value determined according to an elapsed time from occurrence of a specific situation and is a value counted per unit access, and to update the value stored in the storage unit.

Exemplary embodiments of a magnetic disk device will be explained below in detail with reference to the accompanying drawings. The present invention is not limited to the following embodiments.

Embodiment

Figure 1:
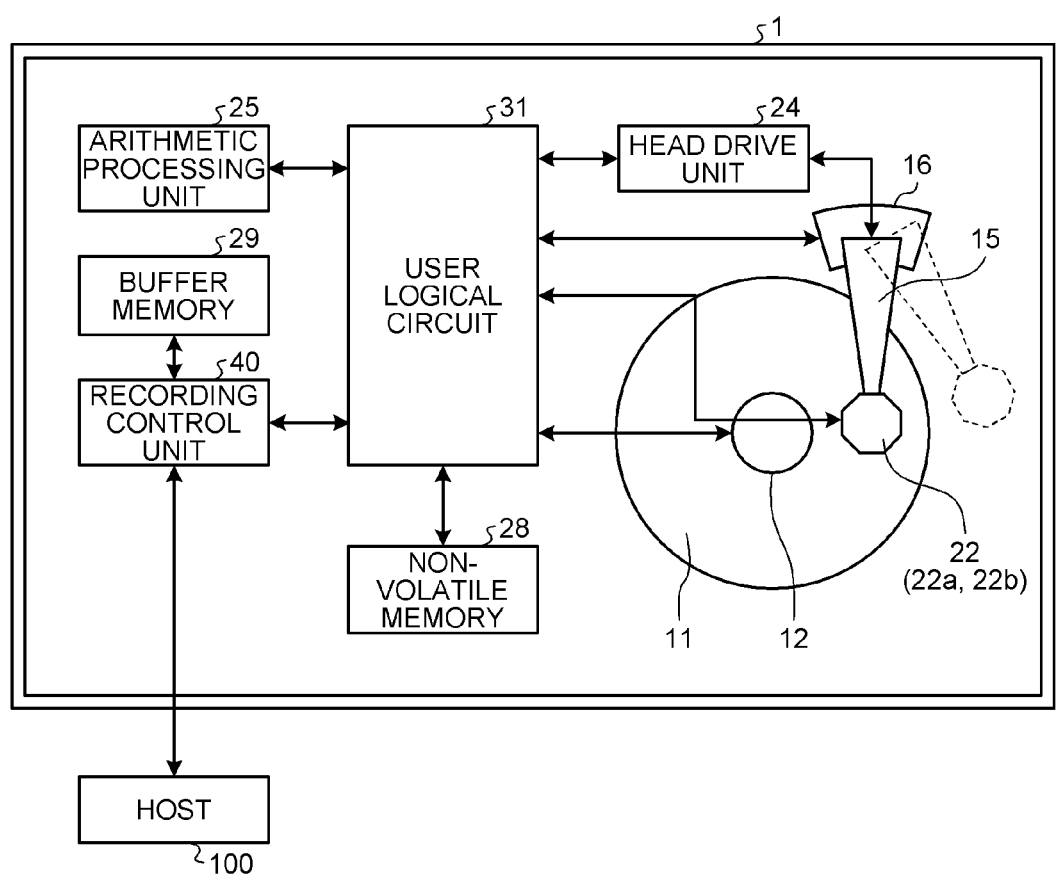
FIG. 1 is a diagram illustrating a configuration of a magnetic disk device according to an embodiment.

A magnetic disk device 1 according to an embodiment will be described using FIG. 1. FIG. 1 is a diagram illustrating a configuration of the magnetic disk device 1.

The magnetic disk device 1, for example, records information on a magnetic disk 11 through a magnetic head 22, and reads out a signal from the magnetic disk 11 through the magnetic head 22. To be specific, the magnetic disk device 1 includes the magnetic disk 11, a spindle motor 12, the magnetic head 22, a head support unit 15, a voice coil motor (VCM) 16, a head drive unit 24, a user logical circuit 31, a buffer memory 29, and a recording control unit 40.

The magnetic disk 11 is rotated by the spindle motor 12 around a rotation axis at a predetermined rotation speed. Rotation of the spindle motor 12 is driven by the user logical circuit 31.

The magnetic head 22 reads/writes data from/on the magnetic disk 11 by a recording head 22a and a reproducing head 22b included therein. Further, the magnetic head 22 is moved along a radial direction (track width direction) of the magnetic disk 11 by the VCM 16 positioning at a tip of the head support unit (actuator arm) 15 and driven by the user logical circuit 31. When rotation of the magnetic disk 11 is being stopped, or the like, the magnetic head 22 is retracted on a ramp (not illustrated) as illustrated by the broken line.

The head drive unit 24 amplifies and outputs a signal read out by the magnetic head 22 from the magnetic disk 11, and supplies the signal to the user logical circuit 31. Further, the head drive unit 24 amplifies a signal for writing data on the magnetic disk 11 supplied from the user logical circuit 31, and supplies the signal to the magnetic head 22.

The recording control unit 40 controls transmission/reception of data to/from a host 100, controls the buffer memory 29, performs processing of correcting an error of recorded data, and the like. The buffer memory 29 is used as a cache of data transmitted/received to/from the host 100. Further, the buffer memory 29 is used for temporarily storing data read out from the magnetic disk 11, data to be written on the magnetic disk 11, control firmware read out from the magnetic disk 11, and the like.

The user logical circuit 31 applies code modulation to data supplied from the recording control unit 40 and to be written on the magnetic disk 11, and supplies the data to the head drive unit 24. Further, the user logical circuit 31 applies code demodulation to a signal read out from the magnetic disk 11 and supplied from the head drive unit 24, and outputs a signal to the recording control unit 40 as digital data.

A non-volatile memory 28 (for example, a flash read only memory (flash ROM)) and an arithmetic processing unit 25 are connected to the user logical circuit 31. The recording control unit 40 performs overall control of the magnetic disk device 1 according to the firmware stored in the non-volatile memory 28 and the magnetic disk 11 in advance. The firmware includes initial firmware and control firmware used for a normal operation. The initial firmware initially executed at startup is, for example, stored in the non-volatile memory 28. The control firmware used for a normal operation is recorded on the magnetic disk 11, and is read out from the magnetic disk 11 and stored in the buffer memory 29 by control according to the initial firmware.

In the magnetic disk device 1, a mechanical wait time such as a seek time and a rotation wait time exists in an access time from when an access request to data occurs to when reading/writing of the data is started. The mechanical wait time is a time to operate the head support unit 15 and the magnetic head 22 by the VCM 16 and to perform positioning of the magnetic head 22 with respect to the magnetic disk 11, and vary depending on a physical address of the recording region of the magnetic disk device 1. Therefore, the magnetic disk device 1 divides the recording region of the magnetic disk 11 into a plurality of regions (a plurality regions each having logical addresses), counts a value according to the access frequency to the magnetic disk 11 for each region by an access counter 41 (see FIG. 2), and stores an access counter table (see FIG. 3) corresponding to the count value. It is desired, in the magnetic disk device 1, to appropriately perform change of association between a logical address and a physical address, that is, to perform data reallocation, based on the access counter table, thereby to improve the performance of the magnetic disk device 1.

Here, consider a case in which the data reallocation is simply executed on the magnetic disk 11 based on the access frequency (the number of accesses) to the data. In this case, the data reallocation is performed such that data having a higher access frequency (a larger number of accesses) is allocated in a region having a shorter access time (faster access).

However, among data accessed under a specific situation (for example, at startup), there are some data having a high priority, which are always accessed under the specific situation although not accessed in situations other than the specific situation. For example, reading out of system data (for example, an operating system (OS)) is sometimes requested from the host 100 to the magnetic disk device 1 at the startup (power ON) of the magnetic disk device 1. Since the system data is not read out at an ordinary operation of the magnetic disk device 1 after read out at the startup of the magnetic disk device 1, the access frequency is likely to be lower than other data in terms of the operation time of the magnetic disk device 1 as a whole.

That is, when focusing on the specific situation, the data the access frequency of which is low in terms of the operation time of the magnetic disk device 1 as a whole and which has a high priority is not easily preferentially reallocated. As a result, at occurrence of the specific situation (for example, at the system startup), a problem that the access time becomes longer, or the like occurs.

Therefore, the present embodiment proposes to improve the performance of the magnetic disk device 1 at the specific situation by varying count step unit of the access counter 41 (that is, a value counted up by the access counter 41 per unit access) in consideration of the specific situation (for example, the system startup).

Figure 2:
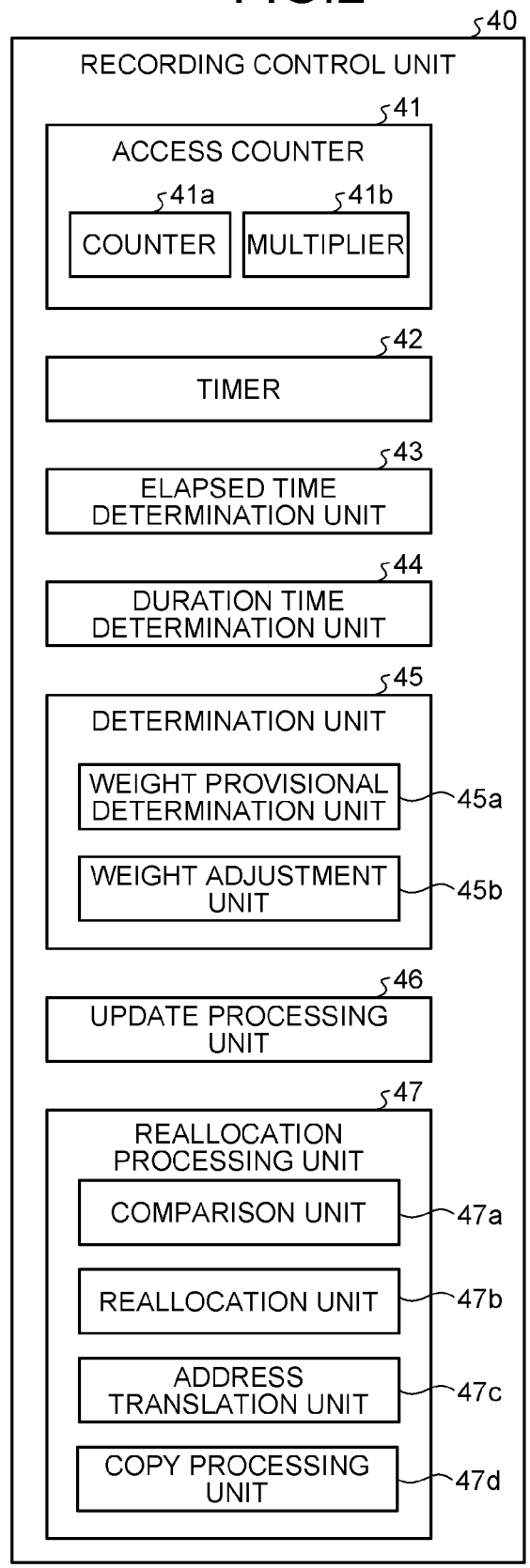
FIG. 2 is a diagram illustrating a configuration of a recording control unit in the embodiment.

To be specific, the recording control unit 40 includes, as illustrated in FIG. 2, the access counter 41, a timer 42, an elapsed time determination unit 43, a duration time determination unit 44, a determination unit 45, an update processing unit 46, and a reallocation processing unit 47. FIG. 2 is a diagram illustrating a configuration of the recording control unit 40.

The access counter 41 counts a value according to the access frequency for each of a plurality of regions RG0 to RG17 obtained by dividing of the storing region of the magnetic disk 11. At this time, the access counter 41 counts the value according to the access frequency in the count step unit determined by the determination unit 45. That is, the recording control unit 40 varies the count step unit of the access counter 41 according to the count step unit determined by the determination unit 45, and counts the value according to the access frequency in the varied count step unit. The access counter 41 supplies the count value to the update processing unit 46.

The access counter table corresponding to the count value of the access counter 41 has a data structure as illustrated in FIG. 3, for example. FIG. 3 is a diagram illustrating the access counter table. In the access counter table, as illustrated in FIG. 3, information that identifies the regions (for example, a region number, a logical address of a head of the region, and the like), and an accumulation value of the count values of the access counter (i.e., a value obtained by accumulating the values counted by the access counter) are associated with each other regarding the plurality of regions RG0 to RG17 in the magnetic disk 11. Each of the regions RG0 to RG17 is within a range of logical addresses (LBA: Logical Block Addresses), and includes one or more logical addresses. It becomes possible to know the accumulation value of the count values of the access counter 41 with respect to each of the regions RG0 to RG17 by referring to the access counter table. Note that the access counter table may be stored in a management region for recording management information in the magnetic disk 11, or may be stored in the non-volatile memory 28 or in the buffer memory 29.

As illustrated in FIG. 2, the access counter 41 includes a counter 41a and a multiplier 41b. The counter 41a counts the number of accesses about each of the regions RG0 to RG17 of the magnetic disk 11. The number of accesses includes the number of reading and the number of writing of data. For example, assume a case in which a read command or a write command with respect to the logical address that belongs to the region RG0 is received from the host 100. When the recording control unit 40 completes the processing of the command, the counter 41a counts up the number of accesses about the region RG0 to which the logical address corresponding to the command belongs.

The multiplier 41b receives a determined weight from the determination unit 45. The multiplier 41b multiplies the weight determined by the determination unit 45 to the count value of the counter 41a. The multiplier 41b supplies the multiplication result to the update processing unit 46 as the count value of the access counter 41.

The timer 42 counts an elapsed time from occurrence of a specific situation about the magnetic disk 11. The timer 42 continues counting of the elapsed time until the specific situation is completed, and stops the counting of the elapsed time when the specific situation is completed. When next the specific situation occurs, the timer 42 outputs the time counted so far to the duration time determination unit 44 as a duration time from the occurrence to the completion of the specific situation. The duration time from the occurrence to the completion of the specific situation is, for example, a duration time from the occurrence timing to a completion timing of a previous specific situation. The timer 42 then resets the counted time, and starts counting of a new elapsed time.

For example, the timer 42 counts the elapsed time from the startup of the magnetic disk 11. For example, when the magnetic disk device 1 recognizes power ON from the host 100, the timer 42 outputs the time counted so far to the duration time determination unit 44 as a startup duration time. The startup duration time is, for example, a duration time from a previous power ON timing to a power OFF timing. The timer 42 resets the counted time, and start counting of a new elapsed time. After the magnetic disk device 1 is powered OFF, the timer 42 stops the counting of time, and starts counting of an elapsed time again from a next power ON timing.

The elapsed time determination unit 43 refers to the timer 42 at a predetermined timing (for example, a fixed period), and recognizes the elapsed time from the occurrence of the specific situation. The elapsed time determination unit 43 determines which time region from among a plurality of time regions (see FIG. 4) the current elapsed time belongs to. The plurality of time regions is divided for a predetermined time from 0 [s], and includes, for example, "0 to 10" [s], "10 to 20" [s], and "20 or over" [s]. For example, when the current elapsed time is 5 [s], the elapsed time determination unit 43 determines that the current elapsed time belongs to the time region "0 to 10" [s]. Further, for example, when the current elapsed time is 15 [s], the elapsed time determination unit 43 determines that the current elapsed time belongs to the time region "10 to 20" [s]. The elapsed time determination unit 43 supplies a determination result to the determination unit 45.

The duration time determination unit 44 acquires the duration time from the occurrence to the completion of the specific situation from the timer 42. The duration time determination unit 44 determines which sections from among a plurality of sections (FIG. 5) the previous duration time belongs to. The plurality of sections are divided at predetermined intervals, and includes, for example, "24 hours or less", "24 to 48 hours", "48 hours to one week", and "one week or more". For example, when the previous duration time is 12 hours, the duration time determination unit 44 determines the previous duration time belongs to the section "24 hours or less". For example, when the previous duration time is 30 hours, the duration time determination unit 44 determines that the previous duration time belongs to the section "24 to 48 hours". The duration time determination unit 44 supplies a determination result to the determination unit 45.

The determination unit 45 receives the determination result about the current elapsed time from the elapsed time determination unit 43, and receives the determination result about the previous duration time from the duration time determination unit 44. The determination unit 45 determines the count step unit of the access counter 41 according to the determination result about the previous duration time and the determination result about the current elapsed time. That is, the determination unit 45 determines the count step unit of the access counter 41 according to the duration time from the occurrence to the completion of the specific situation and the elapsed time from the occurrence of the specific situation. For example, the determination unit 45 includes a weight provisional determination unit 45a and a weight adjustment unit 45b.

The weight provisional determination unit 45a receives a determination result about the current elapsed time. The weight provisional determination unit 45a refers to a weight table (see FIG. 4), and provisionally determines a weight to be multiplied by the multiplier 41b, which is corresponding to the current elapsed time, according to the determination result about the current elapsed time. That is, the weight provisional determination unit 45a provisionally determines a weight to be multiplied by the multiplier 41b according to the elapsed time from the occurrence of the specific situation. The weight provisional determination unit 45a supplies the provisionally-determined weight to the weight adjustment unit 45b.

The weight table has a data structure as illustrated in FIG. 4, for example. FIG. 4 is a diagram illustrating the data structure of the weight table. In the weight table, the time regions and the weights are associated with each other about the plurality of time regions of the elapsed time from the occurrence of the specific situation. The plurality of time regions is the same as the plurality of time regions used by the elapsed time determination unit 43 for determination. The weight with respect to each time region can be identified by referring to the weight table. Note that the weight table may be stored in the management region of the magnetic disk 11, or may be stored in the non-volatile memory 28 or in the buffer memory 29.

As indicated above, an access having a short elapsed time from the occurrence of the specific situation may have a higher priority than an access having a long elapsed time when considering the specific situation (for example, the system startup). The weight table needs to be determined in consideration of the point.

The weight table is determined such that the count step unit of the access counter 41 becomes CU1 when the elapsed time from the occurrence of the specific situation is a first time, and the count step unit of the access counter 41 becomes CU2 when the elapsed time from the occurrence of the specific situation is a second time. For example, the weight table is determined such that the weight to be multiplied by the multiplier becomes a first weight when the elapsed time from the occurrence of the specific situation is the first time, and the weight to be multiplied by the multiplier becomes a second weight when the elapsed time from the occurrence of the specific situation is the second time. The second time is longer than the first time. The second weight is smaller than the first weight. That is, the weight table is determined such that the weight can be larger when the elapsed time from the occurrence of the specific situation (for example, a time from the power ON) is shorter than when longer.

For example, the weight provisional determination unit 45a illustrated in FIG. 2 provisionally determines the weight to be "100" when the current elapsed time belongs to the time region "0 to 10", the weight to be "10" when the current elapsed time belongs to the time region "10 to 20", and the weight to be "1" when the current elapsed time belongs to the time region "20 or over".

The weight adjustment unit 45b receives the provisionally-determined weight from the weight provisional determination unit 45a. Further, the weight adjustment unit 45b determines a coefficient corresponding to the previous duration time by referring to a coefficient table (see FIG. 5) according to a determination result about the previous duration time received from the duration time determination unit 44. The weight adjustment unit 45b adjusts the provisionally-determined weight using the determined coefficient. For example, the weight adjustment unit 45b can obtain an adjusted weight by multiplying the coefficient to the provisionally-determined weight. At this time, the weight adjustment unit 45b can fixedly employ one as the adjusted weight when the multiplication result is smaller than one. That is, the weight adjustment unit 45b adjusts the provisionally-determined weight according to the duration time from the occurrence to the completion of the specific situation. The weight adjustment unit 45b determines the adjusted weight as the weight to be multiplied by the multiplier 41b, and supplies the weight to the multiplier 41b.

The coefficient table has a data structure as illustrated in FIG. 5, for example. FIG. 5 is a diagram illustrating the data structure of the coefficient table. In the coefficient table, the sections and the coefficients are associated with each other about the plurality of sections of the duration time from the occurrence to the completion of the specific situation. The plurality of sections is the same as the plurality of sections used by the duration time determination unit 44 for determination. The coefficient with respect to each section can be identified by referring to the coefficient table. Note that the coefficient table may be stored in the management region of the magnetic disk 11, or may be stored in the non-volatile memory 28 or in the buffer memory 29.

When the duration time from the occurrence to the completion of the specific situation is short, it is highly necessary to preferentially handle data accessed when the elapsed time from the occurrence of the specific situation is short. On contrary, when the duration time from the occurrence to the completion of the specific situation is long, it is relatively less necessary to preferentially handle the data accessed when the elapsed time from the occurrence of the specific situation is short than the case in which the duration time from the occurrence to the completion of the specific situation is long. It is necessary to determine the coefficient in the coefficient table in consideration of the point.

The coefficient table is determined such that the count step unit of the access counter 41 becomes CU3 when the duration time from the occurrence to the completion of the specific situation is a first duration time, and the count step unit of the access counter 41 becomes CU4 when the duration time from the occurrence to the completion of the specific situation is a second duration time. Note that the count step units CU3 and CU4 may be the same as the above-described count step unit CU1 or CU2, or may be different. The second duration time has a longer time interval than the first duration time. CU4 is a smaller value than CU3. That is, the coefficient table is determined such that the coefficient can be smaller when the duration time from the occurrence to the completion of the specific situation (for example, the startup duration time) is longer than the case in which the duration time is short.

For example, the weight adjustment unit 45b illustrated in FIG. 2 determines the coefficient to be "1.5" if the previous duration time belongs to the section "24 hours or less", the coefficient to be "1.0" if the previous duration time belongs to the section "24 to 48 hours", the coefficient to be "0.5" if the previous duration time belongs to the section "48 hours to one week", and the coefficient to be "−1" if the previous duration time belongs to the section "one week or more".

Note that the coefficient corresponding to the section "one week or more" is not limited to "−1", and may be any coefficient, for example, may be "0" as long as the adjusted weight can be fixedly one by the weight adjustment unit 45b.

With this operation, the value of the weight is adjusted by the coefficient. Accordingly, when the startup duration time of the device is short, a data access count weight immediately after the startup is increased. Therefore, data immediately after the startup can be easily preferentially handled when the data on the magnetic disk 11 is reallocated. Further, when the startup duration time of the device is long, the data access count weight immediately after the startup is decreased. Therefore, data having a high access frequency can be easily preferentially handled.

The update processing unit 46 receives the count values of the access counter 41 in a form in association with the regions RG0 to RG17. The update processing unit 46 identifies the region (the range of the logical addresses) corresponding to the count value of the access counter 41, and accesses the access counter table. The update processing unit 46 adds the count value of the access counter 41 to the accumulation value corresponding to the above-identified region (the range of logical addresses) in the access counter table. The update processing unit 46 overwrites and updates the accumulation value corresponding to the identified region (the range of the logical addresses) with an addition result.

Note that, when the access counter table is stored in the management region of the magnetic disk 11, the update processing may be performed by the update processing unit 46 such that the access counter table is read out and temporarily stored in the buffer memory 29, and the updated access counter table is written back to the management region of the magnetic disk 11. Alternatively, the update processing by the update processing unit 46 may be performed such that the accumulation value corresponding to the identified region (the range of logical addresses) in the access counter table is selectively read out and temporarily stored in the buffer memory 29, and the updated accumulation value is written back to the management region of the magnetic disk 11.

The reallocation processing unit 47 reallocates the data recorded on the magnetic disk according to the access counter table (see FIG. 3). The reallocation processing unit 47 performs data reallocation such that data in a region having a higher accumulation value in the access counter table is allocated in a region having a shorter access time (faster access).

In the magnetic disk device 1, as indicated above, the mechanical wait times such as a seek time and a rotation wait time exist in the access time. The mechanical wait times are times for positioning the magnetic head 22 with respect to the magnetic disk 11 by the VCM 16 in FIG. 1.

For example, when the magnetic head 22 is moved from the retracted position illustrated by the broken line onto the magnetic disk 11, the access time of an outer circumferential side track is more likely to be shorter than an inner circumferential side track in a plurality of tracks concentrically provided on the magnetic disk 11.

Further, for example, in the magnetic disk device 1, the access time is more likely to be shorter in a case where data accessed at temporally close timings are allocated in the same or adjacent tracks because the seek time is more likely to be shorter than a case where the data are allocated in different or not adjacent tracks.

Further, for example, since the data amount that can be stored in an outer circumferential side track per one cycle is often larger than an inner circumferential side track in the magnetic disk 11, the data accessed at temporally close timings can be easily allocated in the same track. That is, from this aspect, seeking is less likely to occur and the access time is more likely to be shorter in the outer circumferential side track than the inner circumferential side track.

Further, for example, in the magnetic disk device 1, copied data from the data recorded on the magnetic disk 11 may be stored in the buffer memory 29 as work data. In this case, since the copied data in the buffer memory 29 does not have the mechanical wait time, the access time to the copied data is more likely to be shorter than the access time to the copy source data.

Note that, in the following description, assume that the access order of data is known, and the access time is experimentally obtained in advance in a form in association with the access order of data for each physical address. Further, assume that, when association (allocation) between the physical address and the logical address is changed, the access time is experimentally obtained in advance in a form in association with the access order of data for each physical address for each of allocation patterns. The magnetic disk device 1 may include such a database.

When data of a first logical address is recorded in a first physical address and data of a second logical address is recorded in a second physical address, the reallocation processing unit 47 reallocates the data of the second logical address to the first physical address and reallocates the data of the first logical address to the second physical address. The first logical address is a logical address that belongs to the region corresponding to a first accumulation value in the access counter table. The first physical address is experimentally confirmed in advance to be accessible in the first access time. The second logical address corresponds to a second accumulation value that is larger than the first accumulation value in the access counter table. The second physical address is experimentally confirmed in advance to be accessible in the second access time that is longer than the first access time. That is, the reallocation processing unit 47 changes the association between the logical address and the physical address such that data of a region having a higher accumulation value in the access counter table is allocated in a region having a shorter access time (faster access).

At this time, since the first physical address is accessible in an access time shorter than the second physical address, the first physical address can be positioned at an outer circumferential side of the magnetic disk 11 than the second physical address, for example. Further, for example, when it is known that a third physical address is accessed at a temporally close timing to the first physical address, the first physical address can be positioned on the same track as or on an adjacent track to a track to which the third physical address belongs instead of the track to which the second physical address belongs. Further, for example, a copy of the data recorded in the first physical address on the magnetic disk 11 can be positioned in the buffer memory 29, and a copy of the data recorded in the second physical address can be caused not to exist in the buffer memory 29.

The reallocation processing unit 47 includes a comparison unit 47a, a reallocation unit 47b, a copy processing unit 47d, and an address translation unit 47c.

The comparison unit 47a accesses the access counter table (see FIG. 3), and gets to know the accumulation value of the counting with respect to the regions RG0 to RG17. Further, the comparison unit 47a accesses a logical-physical translation table (see FIG. 6), and get to know the physical address allocated to the logical address that belongs to each of the regions RG0 to RG17. The comparison unit 47a then performs a comparison operation about whether the data having a higher accumulation value in the access counter table is allocated in a region having a shorter access time (faster access). The comparison unit 47a supplies a comparison result to the reallocation unit 47b and the copy processing unit 47d.

The logical-physical translation table has a data structure as illustrated in FIG. 6, for example. In the logical-physical translation table, logical addresses (LBAs: Logical Block Addresses) and physical addresses (PBAs: Physical Blocks Addresses) are associated with each other with respect to a plurality of logical addresses (LBAs). The physical address with respect to each logical address can be identified by referring to the logical-physical translation table. Note that the logical-physical translation table may be stored in the management region of the magnetic disk 11, or may be stored in the non-volatile memory 28 or in the buffer memory 29.

The reallocation unit 47b receives a comparison result from the comparison unit 47a. The reallocation unit 47b reallocates the logical addresses (LBAs) and the physical addresses (PBAs) according to the comparison result.

For example, when the data of the first logical address is allocated to the first physical address and the data of the second logical address is allocated to the second physical address, the reallocation unit 47b reallocates the second logical address to the first physical address, and reallocates the first logical address to the second physical address, according to the comparison result.

Here, as illustrated in FIG. 6, in the logical-physical translation table, the logical address (LBA) and the physical address (PBA) are equal in an initial state. For example, a logical address "0" is allocated to a physical address "0", and a logical address "110" is allocated to a physical address "110".

At this time, for example, assume that the accumulation value of the access counter table with respect the logical addresses "110 to 119" that belong to the region RG11 is larger than the accumulation value of the counter table with respect to the logical addresses "0 to 9" that belong to the region RG0, and the access times of the physical addresses "110 to 119" respectively allocated to the logical addresses "110 to 119" are longer than the access times of the physical addresses "0 to 9" respectively allocated to the logical addresses "0 to 9" (see FIG. 3). For example, when the physical addresses are provided to the magnetic disk 11 in order from an outer circumferential side, a smaller number of a physical address indicates that the physical address is positioned on an outer circumferential side track. In this case, to cause the data in a region having a higher accumulation value in the access counter table to be in a state of a shorter access time, the logical addresses "110 to 119" that belong to the region RG11 are respectively reallocated to the physical addresses "0 to 9", and the logical addresses "0 to 9" that belong to the region RG0 are respectively reallocated to the physical addresses "110 to 119".

Further, for example, assume that the accumulation value of the access counter table with respect to the logical addresses "120 to 129" that belong to the region RG12 is larger than the accumulation value of the access counter table with respect to the logical addresses "10 to 19" that belong to the region RG1, and the access times of the physical addresses "120 to 129" respectively allocated to the logical addresses "120 to 129" are longer than the access times of the physical addresses "10 to 19" respectively allocated to the logical addresses "10 to 19" (see FIG. 3). In this case, to cause the data of a plurality of regions having higher accumulation values in the access counter table to be in a state of being closely allocated on the magnetic disk 11, the logical addresses "120 to 129" that belong to the region RG12 are respectively reallocated to the physical addresses "10 to 19", and the logical addresses "10 to 19" that belong to the region RG1 are respectively reallocated to the physical addresses "120 to 129". Accordingly, the adjacent physical addresses "0 to 9" and "10 to 19" having shorter access times can be allocated to the two regions RG11 and RG12 having higher accumulation values of the count values in the access counter table in FIG. 3. That is, the two regions RG11 and RG12 presumed to be accessed at temporally close timings can be allocated on the same track or adjacent tracks having shorter access times.

The copy processing unit 47d receives the comparison result from the comparison unit 47a. The copy processing unit 47d performs copy processing of copying the data recorded on the magnetic disk 11 to the buffer memory 29 according to the comparison result.

For example, when neither the data of the first logical address nor the data of the second logical address is copied in the buffer memory 29, the copy processing unit 47d selectively copies the data of the first logical address to the buffer memory 29 according to the comparison result. Along with that, the copy processing unit 47d updates the copy management table about the memory address in which the data of the first logical address in the buffer memory 29 has been copied.

Here, as illustrated in FIG. 7, a memory address column corresponding to any of the logical addresses in the copy management table is vacant in the initial state.

At this time, for example, assume that the accumulation value of the access counter table with respect to the logical addresses "110 to 119" that belong to the region RG11 is larger than the accumulation value of the access counter table with respect to the logical addresses "0 to 9" that belong to the region RG0, and the access times of the physical addresses "110 to 119" respectively allocated to the logical addresses "110 to 119" are longer than the access times of the physical addresses "0 to 9" respectively allocated to the logical addresses "0 to 9" (see FIGS. 3 and 6). For example, when the physical addresses are provided to the magnetic disk 11 in order from an outer circumferential side, a smaller number of a physical address indicates that the physical address is positioned on an outer circumferential side track. In this case, to cause the data in the region having a higher accumulation value in the access counter table to be in a state of a short access time, the data of the logical addresses "110 to 119" that belong to the region RG11 are read out from the corresponding physical addresses in the magnetic disk 11 and copied to the memory addresses ADD0 to ADD9 in the buffer memory 29. Along with that, the memory addresses ADD0 to ADD9 are added to the memory address columns corresponding to the logical addresses "110 to 119" in the copy management table. Accordingly, the logical addresses "110 to 119" that belong to the region RG11 can be substantially reallocated to the memory addresses ADD0 to ADD9 in the buffer memory 29, respectively.

Further, for example, assume that the accumulation value of the access counter table with respect to the logical addresses "120 to 129" that belong to the region RG12 is larger than the accumulation value of the access counter table with respect to the logical addresses "10 to 19" that belong to the region RG1, and the access times of the physical addresses "120 to 129" respectively allocated to the logical addresses "120 to 129" are longer than the access times of the physical addresses "10 to 19" respectively allocated to the logical addresses "10 to 19" (see FIGS. 3 and 6). In this case, to cause copies of the data of the plurality of regions having higher accumulation values of the access counter table to be closely allocated in the buffer memory 29, the data of the logical addresses "120 to 129" that belong to the region RG12 are read out from the corresponding physical addresses in the magnetic disk 11 and copied to the memory addresses ADD10 to ADD19 in the buffer memory 29. Along with that, the memory addresses ADD10 to ADD19 are added to the memory address columns corresponding to the logical addresses "120 to 129" in the copy management table. The memory addresses ADD10 to ADD19 are consecutive addresses with respect to the memory addresses ADD0 to ADD9. Accordingly, the adjacent memory addresses ADD0 to ADD9, and ADD10 to ADD19 can be allocated to the two regions RG11 and RG12 having higher accumulation values of the count values in the access counter table illustrated in FIG. 3. That is, the two regions RG11 and RG12 presumed to be accessed at temporally close timings can be allocated to the adjacent memory regions in the buffer memory 29.

Note that, when the copied data in the buffer memory 29 is discarded, the added memory addresses in the copy management table may be deleted from the copy management table. Accordingly, a copy of which logical address data exists in the buffer memory 29 can be known by referring to the copy management table.

When the recording control unit 40 has received a read command or a write command from the host 100 and performs processing, the address translation unit 47c refers to the copy management table (FIG. 7) and the logical-physical translation table (see FIG. 6).

For example, the address translation unit 47c refers to the management table to perform address translation between the logical address (LBA) and the memory address. At this time, about the data of the logical address that has a corresponding memory address recorded in the copy management table (FIG. 7), the address translation unit 47c may preferentially perform the address translation by the copy management table, and preferentially access the copied data stored in the buffer memory 29.

Alternatively, the address translation unit 47c refers to the logical-physical translation table to perform address translation between the logical address (LBA) and the physical address (PBA).

For example, when data is transmitted/received between the magnetic disk device 1 and the host (a personal computer, a server, or the like) 100, as a method of specifying a data storage location of the magnetic disk device 1, it is typical to use the logical address (LBA). For example, when the host 100 requests reading out of data to the magnetic disk device 1, the host 100 issues a read command and waits for data transfer from the magnetic disk device 1. The read command includes the logical address (LBA) in which data of the reading out request and information of the number of blocks to be read out starting from the logical address (LBA). When having received the read command from the host 100, the magnetic disk device 1 refers to the logical-physical translation table (see FIG. 6) to obtain the physical address (PBA) at a data storage position corresponding to the logical address (LBA) specified in the command, reads out data from the magnetic disk 11 or the like, and transfers the data to the host 100.

At this time, the address translation unit 47c illustrated in FIG. 2 identifies the logical address (LBA) included in the read command or a write command. The address translation unit 47c refers to the logical-physical translation table (see FIG. 6), and identifies the physical address (PBA) corresponding to the identified logical address (LBA). The address translation unit 47c supplies the identified physical address (PBA) to the recording control unit 40. Accordingly, the recording control unit 40 accesses the region designated by the physical address (PBA) in the magnetic disk 11, and reads out the data from the region.

Next, a specific operation example of the recording control unit 40 will be described using FIGS. 8 and 9.

FIG. 8 illustrates accumulation values of the counting of the access counter 41 when the determination unit 45 has determined the coefficient=1.5. FIG. 9 illustrates the accumulation values of the counting of the access counter 41 when the determination unit 45 has determined the coefficient=0.5. Note that the determination unit 45 determines the weight by referring to the weight table illustrated in FIG. 4.

FIG. 8 illustrates an example in which the determination unit 45 determines the coefficient=1.5 according to the fact that the device startup duration time is short (for example, the startup duration time is "24 hours or less" in the coefficient table). When the coefficient=1.5, the counting by an access when the time from the power ON is early is greatly influenced by a weight. For example, the weights are respectively 150 when the power ON time is 0 to 10, 15 when the power ON time is 10 to 20, and 1 when the power ON time is 20 or over. While the LBA ranges "RG1" and "RG2" have the number of actual accesses: 4 and 5, the accumulation values of the counting of the access counter are 465 and 480. Therefore, the priority orders in the reallocation in the LBA range are 2 and 1. That is, the data accessed at occurrence of a specific situation (for example, the startup of the magnetic disk device 1) can be easily preferentially handled.

FIG. 9 illustrates an example in which the determination unit 45 determines the coefficient=0.5 according to the fact that the device startup duration time is long (for example, the startup duration time is "48 hours to one week" in the coefficient table). When the coefficient=0.5, the counting by an access when the time from power ON is early is less influenced by a weight. For example, the weights are respectively 50 when the power ON time is 0 to 10, 5 when the power ON time is 10 to 20, and 1 when the power ON time is 20 or over. While the LBA ranges "RG1" and "RG2" have the number of actual accesses: 4 and 5, the accumulation values of the counting of the access counter are 155 and 160. Therefore, the priority orders in the reallocation in the LBA ranges are 4 and 3. That is, the priority of the data accessed at the occurrence of the specific situation (for example, the startup of the magnetic disk device 1) can be relieved, and the data having a high access frequency can be easily preferentially handled.

Figure 10:
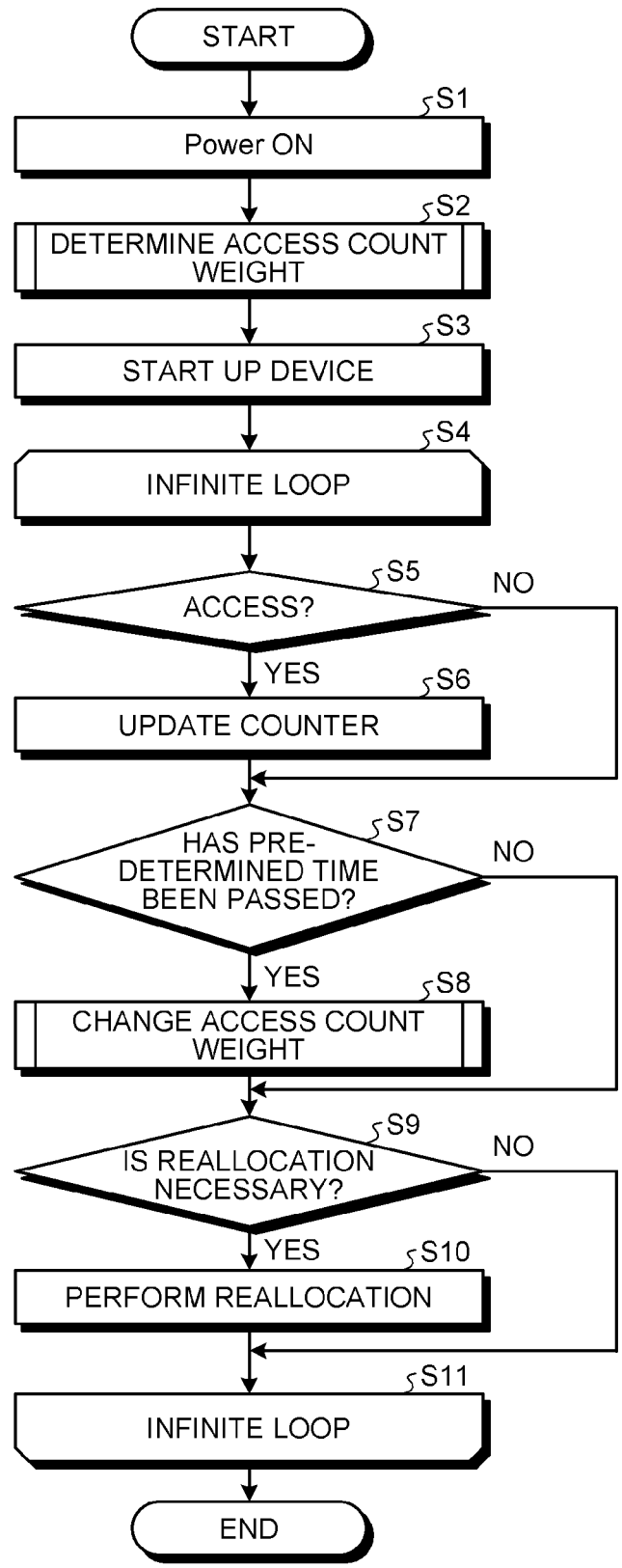
FIG. 10 is a flowchart illustrating an operation of the magnetic disk device according to the embodiment.

Next, an operation of the magnetic disk device 1 will be described using FIG. 10. FIG. 10 is a flowchart illustrating an operation of the magnetic disk device 1.

When the recording control unit 40 recognizes the power ON from the host 100 (step S1), the determination unit 45 determines a weight to be multiplied by the multiplier 41b in the access counter 41 according to the startup duration time of the magnetic disk device 1 and the elapsed time from the startup of the magnetic disk device 1 (step S2). The recording control unit 40 starts up the magnetic disk device 1 according to the power ON procedure (step S3), and starts infinite loop processing (step S4).

The recording control unit 40 determines whether an access to the magnetic disk 11 is requested from the host 100 (step S5). When the access is requested (Yes in step S5), the recording control unit 40 moves the processing to step S6, and when the access is not requested (No in step S5), the recording control unit 40 moves the processing to step S7.

In step S6, the access counter 41 counts the value according to the access frequency to the magnetic disk 11 in the count step unit determined by the determination unit 45. The update processing unit 46 updates the access counter table using the count value of the access counter 41.

The recording control unit 40 determines whether a predetermined time has been passed from the startup of the magnetic disk device 1 (step S7). The predetermined time is a time indicating a boundary of the time regions in the weight table, for example, and is 10 [s] or 20 [s] (see FIG. 4). When the predetermined time has been passed (Yes in step S7), the recording control unit 40 moves the processing to step S8, and when the predetermined time has not been passed (No in step S7), the recording control unit 40 moves the processing to step S9.

In step S8, the determination unit 45 changes the weight to be multiplied by the multiplier 41b in the access counter 41 according to the elapsed time from the startup of the magnetic disk device 1.

The recording control unit 40 determines whether the reallocation of data is necessary (step S9).

For example, when a first threshold time from the startup of the magnetic disk device 1 has been passed, the recording control unit 40 determines the data reallocation is necessary, and when the first threshold time from the startup of the magnetic disk device 1 has not been passed, the recording control unit 40 determined the data reallocation is not necessary. The first threshold time is a time experimentally acquired in advance as a time from the startup of the magnetic disk device 1, in which data reallocation is necessary.

Alternatively, for example, when a second threshold time from the previous reallocation has been passed, the recording control unit 40 determines the data reallocation is necessary, and when the second threshold time from the previous reallocation has not been passed, the recording control unit 40 determines the data reallocation is not necessary. The second threshold time is a time experimentally acquired in advance as a time from the previous reallocation in which the data reallocation is necessary.

Alternatively, for example, when the data amount of a media cache region in the magnetic disk 11 exceeds a threshold, the recording control unit 40 determines the data reallocation is necessary, and when the data amount of the media cache region in the magnetic disk 11 does not exceed the threshold, the recording control unit 40 determines the data reallocation is not necessary. The media cache region is a region in the magnetic disk 11, for temporarily recording data, separately provided from the region in the magnetic disk 11, in which the data is recorded.

When the data reallocation is necessary (Yes in step S9), the recording control unit 40 moves the processing to step S10, and when the data reallocation is not necessary (No in step S9), the recording control unit 40 moves the processing to step S11.

In step S10, the reallocation processing unit 47 reallocates the data recorded in the magnetic disk 11 (or the magnetic disk 11 or the buffer memory 29) according to the access counter table (see FIG. 3).

Step S11 is the end of the loop, and thus, step S11 returns the processing to step S4 that is the start of the loop. Accordingly, the loop processing of steps S4 to S11 are repeated until the magnetic disk device 1 is powered OFF, and the processing is terminated when the magnetic disk device 1 is powered OFF.

Figure 11:
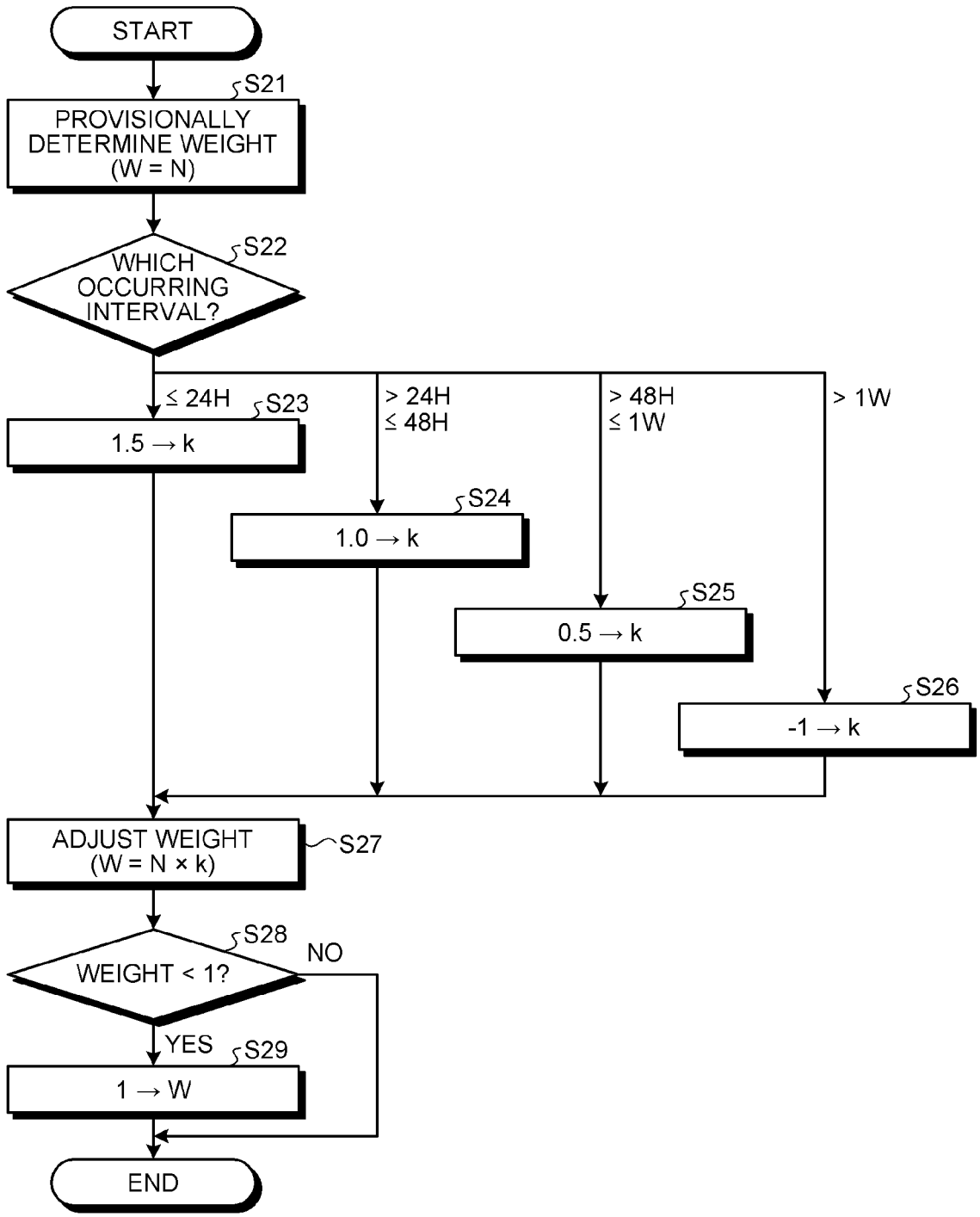
FIG. 11 is a flowchart illustrating determination of a weight of the access counter in the embodiment.

Next, details of the determination of the weight of access counter 41 (step S2) will be described using FIG. 11. FIG. 11 is a flowchart illustrating the determination of the weight of the access count.

The determination unit 45 refers to the weight table (see FIG. 4), and provisionally determines a weight W to be multiplied by the multiplier 41b to be a value N corresponding to the current elapsed time from the startup of the magnetic disk device 1 (step S21).

The duration time determination unit 44 determines whether which section from among the plurality of sections (FIG. 5) the previous duration time belongs to (step S22).

When the previous duration time is determined to belong to "24 hours or less", the determination unit 45 refers to the coefficient table (see FIG. 5), and determines a coefficient k to be used for weight adjustment to be "1.5" (step S23). When the previous duration time is determined to belong to "24 to 48 hours", the determination unit 45 refers to the coefficient table (see FIG. 5), and determines the coefficient k to be used for weight adjustment to be "1.0" (step S24). When the previous duration time is determined to belong to "48 hours to one week", the determination unit 45 refers to the coefficient table (see FIG. 5), and determines the coefficient k to be used for weight adjustment to be "0.5" (step S25). When the previous duration time is determined to belong to "one week or more", the determination unit 45 determines the coefficient k to be used for weight adjustment to be "−1" (step S26).

The determination unit 45 multiplies the determined coefficient k to the provisionally-determined weight N to generate an adjusted weight W=N×k (step S27).

The determination unit 45 determines whether the value of the weight W=N×k adjusted by the multiplication is smaller than one (step S28). When the value of the weight W is smaller than one (Yes in step S28), the determination unit 45 moves the processing to step S29, and when the value of the weight W is one or more (No in step S28), the determination unit 45 terminates the processing.

In step S29, the determination unit 45 fixedly determines one to be the adjusted weight W.

Figure 12:
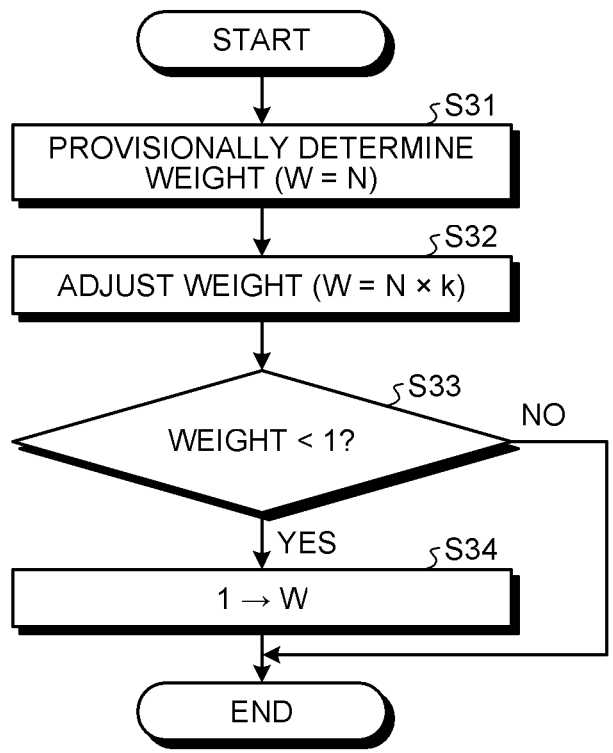
FIG. 12 is a flowchart illustrating a change of the weight of the access counter in the embodiment.

Next, details of the change of the weight of the access counter 41 (step S8) will be described using FIG. 12. FIG. 12 is a flowchart illustrating the change of the weight of the access counter 41.

The determination unit 45 refers to the weight table (see FIG. 4), and provisionally determines the weight W to be multiplied by the multiplier 41*b* to be a value N corresponding to the current elapsed time from the startup of the magnetic disk device 1 (step S31).

The determination unit 45 multiplies the determined coefficient k to the provisionally-determined weight N to generate the adjusted weight W=N×k (step S32).

The determination unit 45 determines whether the value of the weight W=N×k adjusted by the multiplication is smaller than one (step S33). When the value of the weight W is smaller than one (Yes in step S33), the determination unit 45 moves the processing to step S34, and when the value of the weight W is one or more (No in step S33), the determination unit 45 terminates the processing.

In step S34, the determination unit 45 fixedly determines one to be the adjusted weight W.

As described above, in the embodiment, the determination unit 45 determines the count step unit of the access counter 41 according to the elapsed time from the occurrence of the specific situation in the magnetic disk device 1. For example, when the elapsed time from the occurrence of the specific situation is the first time, the determination unit 45 determines the count step unit of the access counter 41 to be CU1, and when the elapsed time from the occurrence of the specific situation is the second time longer than the first time, the determination unit 45 determines the count step unit of the access counter 41 to be CU2 smaller than CU1. That is, the determination unit 45 determines the count step unit of the access counter 41 such that the region in which data accessed immediately after the occurrence of the specific situation is recorded is preferentially handled. The update processing unit 46 updates the access counter table using the count value counted by the access counter 41 in the count step unit determined by the determination unit 45. The reallocation processing unit 47 reallocates the data recorded on the magnetic disk 11 according to the updated access counter table. Accordingly, the region in which data accessed immediately after the occurrence of the specific situation is recorded is preferentially handled at data reallocation. Therefore, the performance of the magnetic disk device 1 in the specific situation can be improved. For example, the access time at the occurrence of the specific situation (for example, at the system startup) can be reduced.

Further, in the embodiment, in the magnetic disk device 1, when the elapsed time from the occurrence of the specific situation is the first time, the determination unit 45 determines the weight to be multiplied by the multiplier 41*b* in the access counter 41 according to the first weight. When the elapsed time from the occurrence of the specific situation is the second time that is longer than the first time, the determination unit 45 determines the weight to be multiplied by the multiplier 41*b* in the access counter 41 according to the second weight that is smaller than the first weight. Accordingly, the determination unit 45 can determine the count step unit of the access counter 41 to be CU1 when the elapsed time from the occurrence of the specific situation is the first time, and can determine the count step unit of the access counter 41 to be CU2 that is smaller than CU1 when the elapsed time from the occurrence of the specific situation is the second time that is longer than the first time. That is, the count step unit of the access counter 41 can be determined such that the data accessed immediately after the occurrence of the specific situation is recorded is preferentially handled.

Further, in the embodiment, in the magnetic disk device 1, the determination unit 45 determines the count step unit of the access counter 41 according to the duration time from the occurrence to the completion of the specific situation and the elapsed time from the occurrence of the specific situation. For example, when the duration time from the occurrence to the completion of the specific situation is the first duration time, the determination unit 45 determines the count step unit of the access counter 41 to be CU3, and when the duration time from the occurrence to the completion of the specific situation is the second duration time that is longer than the first duration time, the determination unit 45 determines the count step unit of the access counter 41 to be CU4 that is smaller than CU3. That is, the determination unit 45 determines the count step unit of the access counter 41 such that, when the duration time from the occurrence to the completion of the specific situation (for example, the startup duration time of the device) is short, the recording region of the data accessed immediately after the occurrence of the specific situation can be easily preferentially handled, and when the duration time from the occurrence to the completion of the specific situation (for example, the startup duration time of the device) is long, the recording region of the data having a high access frequency can be easily preferentially handled. Accordingly, the performance of the magnetic disk device 1 in the specific situation can be improved in consideration of a use status (use environment) of the magnetic disk device 1.

Further, in the embodiment, in the magnetic disk device 1, the determination unit 45 provisionally determines the weight to be multiplied by the multiplier 41*b* according to the elapsed time from the occurrence of the specific situation, adjusts the provisionally-determined weight using the coefficient according to the duration time from the occurrence to the completion of the specific situation, and determines the adjusted weight as the weight to be multiplied by the multiplier 41*b*. At this time, the determination unit 45 determines the coefficient to be used for weight adjustment when the duration time from the occurrence to the completion of the specific situation is the first duration time to be the first coefficient, and determines the coefficient to be used for weight adjustment when the duration time from the occurrence to the completion of the specific situation is the second duration time that is longer than the first duration time to be the second coefficient that is smaller than the first coefficient. Accordingly, the determination unit 45 can determine the count step unit of the access counter 41 such that the recording region of the data accessed immediately after the occurrence of the specific situation can be preferentially handled when the duration time from the occurrence to the completion of the specific situation (for example, the startup duration time of the device) is short, and the recording region of the data having a high access frequency can be preferentially handled when the duration time from the occurrence to the completion of the specific situation (for example, the startup duration time of the device) is long.

Further, in the magnetic disk device 1 of the embodiment, when the data of the first logical address is recorded in the first physical address and the data of the second logical address is recorded in the second physical address, the reallocation processing unit 47 reallocates the data of the second logical address to the first physical address, and reallocates the data of the first logical address to the second physical address. The first logical address is the logical address that belongs to the region corresponding to the first accumulation value in the access counter table. The first physical address is accessible in the first access time. The second logical address is a logical address that belongs to the region corresponding to the second accumulation value that is larger than the first accumulation value in the access counter table. The second physical address is accessible in the second access time that is longer than the first access time. That is, the reallocation processing unit 47 reallocates the data such that the data in the region having a higher accumulation value in the access counter table can be allocated in a physical address having a shorter access time (faster access). Accordingly, the performance of the magnetic disk device 1 in the specific situation can be improved according to the access counter table including the accumulation value counted by the weight in consideration of the specific situation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a magnetic disk including a recording region;
    a storage unit configured, for each of a plurality of regions, to store a first count value in association with each of the plurality of regions, the first count value being a value according to a number of accesses of a corresponding region of the plurality of regions, the plurality of regions being obtained by dividing of the recording region of the magnetic disk, each of the plurality of regions being allocated at least one logical address; and
    a control unit configured, for each of the plurality of regions, to generate the first count value, to count a second count value, to generate a first accumulation value based on the first count value and the second count value, to update the stored first count value with the first accumulation value, and to reallocate data recorded on the magnetic disk according to the first value, the second count value being a value according to the number of accesses of the corresponding region, the second count value being counted by a variable count step size, the variable count step size being a size variably determined according to an elapsed time from occurrence of startup of the magnetic disk device and being a size to be counted per unit access, and wherein
    the storage unit stores an access counter table in which a logical address and a first count value are associated with each other with respect to a plurality of logical addresses, and
    the control unit specifies a logical address to be updated in the access counter table, counts a second count value of the specified logical address, generates a first accumulation value of the specified logical address based on the first count value associated with the specified logical address and the second count value associated with the specified logical address, and overwrites, with the first accumulation value of the specified logical address, the first count value associated with the specified logical address in the access counter table.

2. The magnetic disk device according to claim 1, wherein, when data of a first logical address corresponding to a first accumulation value is recorded in a first physical address accessible in a first access time, and data of a second logical address corresponding to a second accumulation value that is larger than the first accumulation value is recorded in a second physical address accessible in a second access time that is longer than the first access time, the control unit reallocates the data of the second logical address to the first physical address, and reallocates the data of the first logical address to the second physical address.

3. The magnetic disk device according to claim 1, wherein the control unit determines the variable count step size to be a first size when the elapsed time from occurrence of the startup of the magnetic disk device is a first time, and determines the variable count step size to be a second size that is smaller than the first size when the elapsed time from occurrence of the startup of the magnetic disk device is a second time that is longer than the first time.

4. The magnetic disk device according to claim 1, wherein the control unit determines the variable count step size according to a duration from occurrence to completion of the startup of the magnetic disk device and the elapsed time from occurrence of the startup of the magnetic disk device.

5. The magnetic disk device according to claim 1, wherein the control unit determines the variable count step size to be a first size when a duration from occurrence to completion of the startup of the magnetic disk device is a first duration time, and determines the variable count step size to be a second size that is smaller than the first size when the duration from occurrence to completion of the startup of the magnetic disk device is a second duration time that is longer than the first duration time.

6. A method of controlling a magnetic disk device including a magnetic disk including a recording region, the method comprising:
    for each of a plurality of regions, storing a first count value in association with each of the plurality of regions, the first count value being a value according to a number of accesses of a corresponding region of the plurality of regions, the plurality of regions being obtained by dividing of the recording region of the magnetic disk, each of the plurality of regions being allocated at least one logical address;
    for each of the plurality of regions, generating the first count value, counting a second count value, generating a first accumulation value based on the first count value and the second count value, updating the stored first count value with the first accumulation value, and reallocating data recorded on the magnetic disk according to the first accumulation value, the second count value being a value according to the number of accesses of the corresponding region, the second count value being counted by a variable count step size, the variable count step size being a size variably determined according to an elapsed time from occurrence of startup of the magnetic disk device and being a size to be counted per unit access; and
    wherein the storing includes:
    storing an access counter table in which a logical address and a first count value are associated with each other with respect to a plurality of logical addresses, and the counting includes:
specifying a logical address to be updated in the access counter table, and
counting a second count value of the specified logical address,
the generating a first accumulation value includes:
generating a first accumulation value of the specified logical address based on the first count value associated with the specified logical address and the second count value associated with the specified logical address, and
the updating includes:
overwriting, with the first accumulation value of the specified logical address, the first count value associated with the specified logical address in the access counter table.

7. The controlling method according to claim 6, wherein the updating includes:
when data of a first logical address corresponding to a first accumulation value is recorded in a first physical address accessible in a first access time, and data of a second logical address corresponding to a second accumulation value that is larger than the first accumulation value is recorded in a second physical address accessible in a second access time that is longer than the first access time, reallocating the data of the second logical address to the first physical address, and reallocating the data of the first logical address to the second physical address.

8. The controlling method according to claim 6, wherein the updating includes:
determining the variable count step size to be a first size when the elapsed time from occurrence of the startup of the magnetic disk device is a first time, and determining the variable count step size to be a second size that is smaller than the first size when the elapsed time from occurrence of the startup of the magnetic disk device is a second time that is longer than the first time.

9. The controlling method according to claim 6, wherein the updating includes:
determining the variable count step size according to a duration from occurrence to completion of the startup of the magnetic disk device and the elapsed time from occurrence of the startup of the magnetic disk device.

10. The controlling method according to claim 6, wherein the updating includes:
determining the variable count step size to be a first size when a duration from occurrence to completion of the startup of the magnetic disk device is a first duration time, and determining the variable count step size to be a second size that is smaller than the first size when the duration from occurrence to completion of the magnetic disk device is a second duration time that is longer than the first duration time.

* * * * *